United States Patent
Hatano

(10) Patent No.: US 10,368,425 B2
(45) Date of Patent: Jul. 30, 2019

(54) LIGHTING SYSTEM, METHOD FOR TRANSMITTING SCHEDULE INFORMATION IN LIGHTING SYSTEM, AND OPERATION TERMINAL

(71) Applicant: Panasonic Intellectual Property Management Co., Ltd., Osaka (JP)

(72) Inventor: Yuka Hatano, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/191,417

(22) Filed: Nov. 14, 2018

(65) Prior Publication Data
US 2019/0150250 A1 May 16, 2019

(30) Foreign Application Priority Data

Nov. 15, 2017 (JP) .................................. 2017-220160

(51) Int. Cl.
*H05B 37/02* (2006.01)
*H04B 10/11* (2013.01)

(52) U.S. Cl.
CPC ......... *H05B 37/0272* (2013.01); *H04B 10/11* (2013.01); *H05B 37/0281* (2013.01)

(58) Field of Classification Search
None
See application file for complete search history.

(56) References Cited

U.S. PATENT DOCUMENTS

| 2014/0070706 | A1* | 3/2014 | Fushimi | H05B 33/0863 |
| | | | | 315/131 |
| 2014/0070707 | A1* | 3/2014 | Nagazoe | H04B 10/116 |
| | | | | 315/151 |
| 2016/0270195 | A1 | 9/2016 | Ikehara et al. | |
| 2018/0235059 | A1* | 8/2018 | Kurihara | H05B 37/0272 |

FOREIGN PATENT DOCUMENTS

| JP | 2011-146773 A | 7/2011 |
| JP | 2015-115861 A | 6/2015 |
| JP | 2016-167385 A | 9/2016 |
| JP | 2016-178014 A | 10/2016 |

* cited by examiner

*Primary Examiner* — Jany Richardson
(74) *Attorney, Agent, or Firm* — McDermott Will & Emery LLP

(57) ABSTRACT

An operation terminal in a lighting system includes: a storage which stores identification information of each of the plurality of lighting controllers; a communication circuit which performs wireless communication with the plurality of lighting controllers; and a terminal controller which transmits schedule information for each of the plurality of lighting devices to the plurality of lighting controllers via the communication circuit. The terminal controller obtains the identification information of a current lighting controller currently connected to the operation terminal from the current lighting controller via the communication circuit. The terminal controller then confirms, based on the identification information, that the identification information of the current lighting controller is identical to the identification information of the target lighting controller to which the schedule information for a target lighting device is to be transmitted, and then transmits the schedule information for the target lighting device to the current lighting controller.

13 Claims, 12 Drawing Sheets

FIG. 4

| SCHEDULE DATA | | IDENTIFICATION INFORMATION OF EACH LIGHTING CONTROLLER | LIGHTING CONTROLLER NUMBERS |
|---|---|---|---|
| LIGHTING STATES OF LIGHTING DEVICES | TIME POINTS | | |
| SCHEDULE INFORMATION A | ON AT 100% | 8:00 – 12:00 | aaa | 21 |
| SCHEDULE INFORMATION B | ON AT 100% | 12:00 – 13:00 | bbb | 22 |
| SCHEDULE INFORMATION C | ON AT 100% | 8:00 – 12:00 | ccc | 23 |
| SCHEDULE INFORMATION D | ON AT 30% | 17:00 – 8:00 | ddd | 24 |

LIGHTING SYSTEM, METHOD FOR TRANSMITTING SCHEDULE INFORMATION IN LIGHTING SYSTEM, AND OPERATION TERMINAL

CROSS REFERENCE TO RELATED APPLICATION

This application claims the benefit of priority of Japanese Patent Application Number 2017-220160 filed on Nov. 15, 2017, the entire content of which is hereby incorporated by reference.

BACKGROUND

1. Technical Field

The present disclosure relates to: a lighting system including lighting devices, lighting controllers, and an operation terminal; a method for transmitting schedule information in the lighting system, and the operation terminal for transmitting the schedule information.

2. Description of the Related Art

Lighting systems each including a plurality of lighting devices, a plurality of lighting controllers which control the plurality of lighting devices, and an operation terminal (setting device) which performs wireless communication with the plurality of lighting controllers have been known conventionally (for example, see FIG. 19 of Japanese Unexamined Patent Application Publication No. 2016-178014).

In such a conventional lighting system, lighting of each of the plurality of lighting devices is controlled based on schedule information indicating a lighting state of the lighting device and a time point or a time period which are associated with each other. The schedule information is generated by the operation terminal, and is transmitted from the operation terminal to the lighting controller.

However, when the schedule information is transmitted in the lighting system, the operation terminal may be connected to a lighting controller which is not a transmission target of the schedule information. Such a case involves a problem that the schedule information is erroneously transmitted to the lighting controller which is not the transmission target.

In view of this, the present disclosure provides a lighting system, etc. which reliably transmits schedule information to the lighting controller which is the transmission target of the schedule information.

SUMMARY

A lighting system according to an aspect of the present disclosure is a lighting system including: a plurality of lighting devices; a plurality of lighting controllers each of which controls a lighting state of at least one lighting device included in the plurality of lighting devices; and an operation terminal configured to control the plurality of lighting controllers, wherein the operation terminal includes: a storage configured to store identification information of each of the plurality of lighting controllers; a communication circuit configured to perform wireless communication with the plurality of lighting controllers; and a terminal controller configured to transmit schedule information for each of the plurality of lighting devices to the plurality of lighting controllers via the communication circuit, the schedule information indicating a lighting state and a time point or a time period which are associated with each other, and the terminal controller is configured to obtain identification information of a current lighting controller currently connected to the operation terminal from the current lighting controller via the communication circuit, confirm, based on the identification information, that the current lighting controller is identical to a target lighting controller to which the schedule information for a target lighting device is to be transmitted, and then transmit the schedule information for the target lighting device to the current lighting controller.

An operation terminal according to an aspect of the present disclosure is an operation terminal including: a communication circuit configured to establish communication with a lighting controller having a strong radio field intensity among a plurality of lighting controllers which control lighting states of a plurality of lighting devices; a storage configured to store identification information of each of the plurality of lighting controllers; and a terminal controller configured to transmit schedule information for a target lighting device to the target lighting controller via the communication circuit, the schedule information for the target lighting device indicating a lighting state of the target lighting device and a time point or a time period which are associated with each other, the target lighting device being under command of the target lighting controller, wherein the storage is configured to store identification information of the target lighting controller, and the terminal controller is configured to obtain identification information of a current lighting controller currently connected to the operation terminal from the current lighting controller via the communication circuit, confirm that the identification information of the current lighting controller is identical to the identification information of the target lighting controller, and then transmit the schedule information for the target lighting device to the current lighting controller.

A method for transmitting schedule information in a lighting system according to an aspect of the present disclosure is a method for transmitting schedule information in a lighting system, the lighting system including: a plurality of lighting devices; a plurality of lighting controllers each of which controls a lighting state of at least one lighting device included in the plurality of lighting devices; and an operation terminal which controls a current lighting controller currently connected to the operation terminal, the schedule information indicating a lighting state and a time point or a time period which are associated with each other, the schedule information transmitting method including: obtaining identification information of the current lighting controller from the current lighting controller via the communication circuit; and after it is confirmed that the current lighting controller is identical to a target lighting controller to which schedule information for the target lighting device is to be transmitted, transmitting the schedule information for the target lighting device to the current lighting controller.

In this way, the lighting system, etc. allows reliable transmission of the schedule information to the lighting controller which is the transmission target of the schedule information.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 4 is a diagram illustrating examples of schedule information to be transmitted from the operation terminal to the lighting controllers in the lighting system according to the embodiment.

DETAILED DESCRIPTION OF THE EMBODIMENT

Underlying Knowledge Forming Basis of the Present Disclosure

Figure 1:
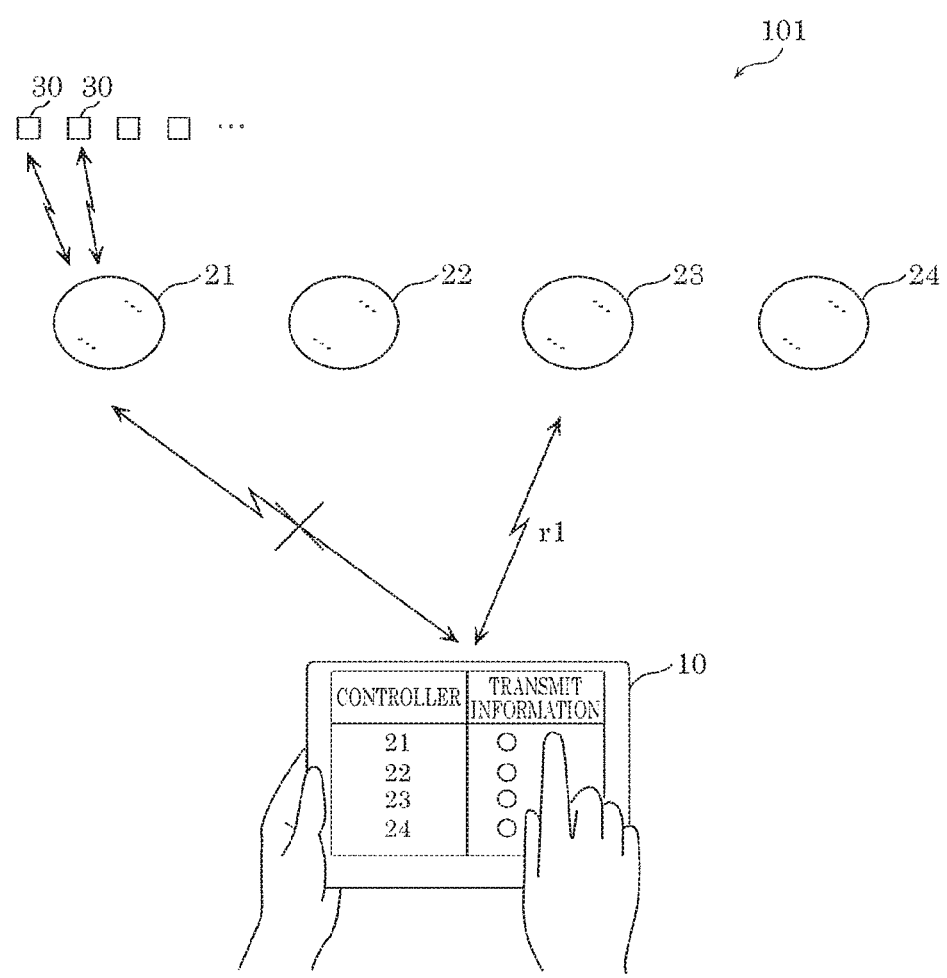
FIG. 1 is a schematic diagram illustrating a lighting system in a comparative example.

First, underlying knowledge forming basis of the present disclosure is described below with reference to FIG. 1. FIG. 1 is a schematic diagram of lighting system 101 in a comparative example.

Lighting system 101 in a comparative example includes: a plurality of lighting devices 30; a plurality lighting controllers 21, 22, 23, and 24 which control the plurality of lighting devices 30; and operation terminal 10 which communicates by radio r1 with each of lighting controllers 21 to 24.

Each of lighting controllers 21 to 24 controls at least one lighting device 30 under the command of the lighting controller based on schedule information stored in the lighting controller itself. The schedule information is generated by, for example, operation terminal 10, and is transmitted from operation terminal 10 to each of lighting controllers 21 to 24.

Operation terminal 10 transmits schedule information to, for example, a lighting controller (that is, for example, lighting controller 21) connected via WiFi (registered trademark). However, when the radio field intensity between operation terminal 10 and the lighting controller connected becomes weak, operation terminal 10 automatically establishes connection with another lighting controller (for example, lighting controller 23) that generates a radio field intensity stronger than the earlier mentioned one. For this reason, lighting system 101 involves a problem that connection with lighting controller 23 unintended by operation terminal 10 is established and the mismatching schedule information is transmitted to lighting controller 23 in lighting system 101.

In a lighting system according to an embodiment, identification information of a lighting controller connected to an operation terminal is obtained from the lighting controller before the schedule information is transmitted. Based on the obtained information, it is confirmed that the lighting controller connected is identical to the lighting controller which is a transmission target of the schedule information. In this way, the schedule information can be reliably transmitted to the lighting controller which is the transmission target of the schedule information.

Hereinafter, a lighting system, a method for transmitting schedule information in the lighting system, and an operation terminal according to an embodiment are described with reference to the drawings. It is to be noted that each of the embodiment and variations thereof indicates a specific example. Accordingly, the numerical values, shapes, materials, constituent elements, the arrangement and connection of the constituent elements, etc. indicated in the following exemplary embodiment, etc. are mere examples, and therefore do not limit the scope of the present disclosure. Therefore, among the constituent elements in the following exemplary embodiment, etc., constituent elements not recited in any one of the independent claims that define the most generic concept are described as arbitrary constituent elements.

It is to be noted that each of the drawings is a schematic diagram and is not always illustrated precisely. In addition, in the drawings, substantially the same constituent elements are assigned the same reference signs and overlapping descriptions are omitted or simplified.

Embodiment 1-1. An Overall Configuration of a Lighting System

Figure 2:
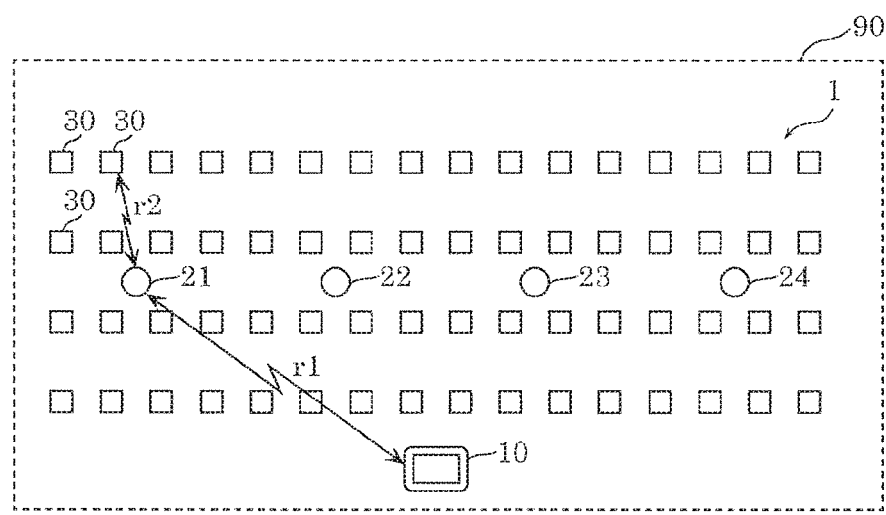
FIG. 2 is a diagram illustrating an arrangement example of lighting devices, lighting controllers, and an operation terminal included in a lighting system according to an embodiment.

An overall configuration of lighting system 1 according to an embodiment is described with reference to FIG. 2. FIG. 2 is a diagram illustrating an example of an arrangement of lighting devices 30, lighting controllers 21, 22, 23, and 24, and operation terminal 10 included in lighting system 1 according to the embodiment.

Lighting system 1 includes the plurality of lighting devices 30, the plurality of lighting controllers 21 to 24, and operation terminal 10. Although sixty-four lighting devices 30 are illustrated in FIG. 2, in reality, a hundred or more lighting devices 30 may be installed in a part (for example, on a ceiling) of building 90. In addition, although four lighting controllers 21 to 24 are illustrated as an example, in reality, two, three, or no fewer than five lighting controllers may be installed in a part of building 90.

Operation terminal 10 is capable of communicating with each of lighting controllers 21 to 24 via radio r1. For example, communication methods by radio r1 includes methods using WiFi conforming to the IEEE802.11 standard, and the like. Operation terminal 10 establishes connection with a lighting controller having a strong radio field intensity out of the plurality of lighting controllers 21 to 24. For example, when operation terminal 10 is connected to lighting controller 21, operation terminal 10 does not establish communication with any of lighting controllers 22 to 24. It is to be noted that a state where each of communication parties has the address of the other communication party is referred to as being connected. The radio field intensity is indicated by, for example, a received signal strength indicator (RSSI).

The plurality of lighting controllers 21 to 24 are capable of communicating with the plurality of lighting controllers 30 via radio r2. For example, communication methods by radio r2 include methods using specified low-power radio using a frequency band including 920 MHz or 2.4 GHz, Zigbee (registered trademark), Bluetooth (registered trademark), WiFi (registered trademark), and the like.

1-2. Each of the Elements of the Lighting System

Figure 3:
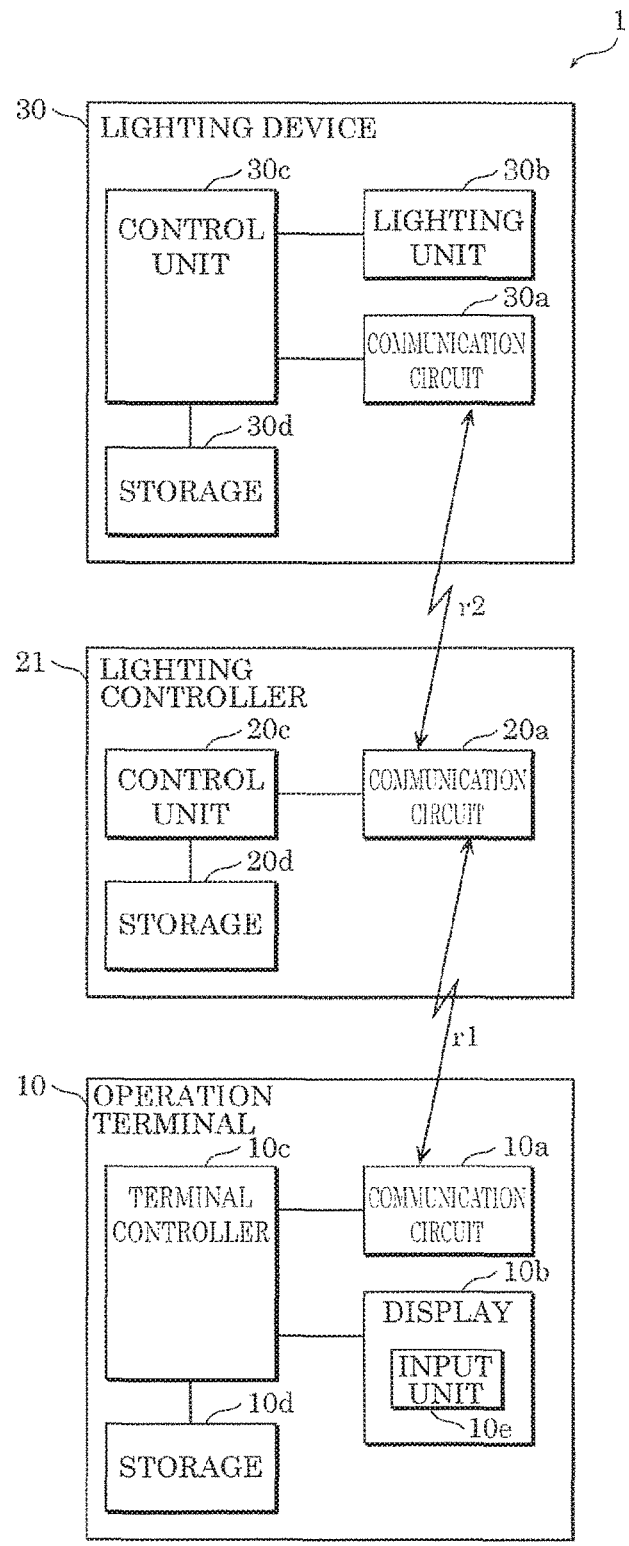
FIG. 3 is a block diagram illustrating a configuration of a lighting system according to the embodiment.

Next, each of the elements of lighting system 1 is described with reference to FIGS. 3 and 4. FIG. 3 is a block diagram illustrating a configuration of lighting system 1. FIG. 4 is a diagram illustrating examples of schedule information A, B, C, and D to be transmitted from operation terminal 10 to lighting controllers 21, 22, 23, and 24, respectively. Here, one lighting device 30 included in the plurality of lighting devices 30 is taken as a representative example, and lighting controller 21 out of the plurality of lighting controllers 21 to 24 is also taken as a representative example.

Lighting device 30 is, for example, a light emitting diode (LED) light. As illustrated in FIG. 3, lighting device 30 includes communication circuit 30*a*, lighting unit 30*b*, control unit 30*c*, and storage 30*d*. Each of communication circuit 30*a*, lighting unit 30*b*, and storage 30*d* is connected to control unit 30*c*.

Communication circuit 30*a* includes an antenna, a wireless module, etc. Communication circuit 30*a* is capable of communicating with each of lighting controllers 21 to 24 by radio r2.

Lighting unit 30*b* includes, for example, light sources such as a plurality of light emitting diodes each of which emits white light, red light, green light, or blue light.

Storage 30*d* includes a random access memory (RAM), a read only memory (ROM), etc. Storage 30*d* includes identification information of lighting device 30 itself stored therein. The identification information is, for example, a media access control (MAC) address.

Control unit 30*c* includes a central processing unit (CPU), etc. Control unit 30*c* controls the lighting state of lighting unit 30*b*, based on an instruction made by a lighting controller (for example, lighting controller 21) out of lighting controllers 21 to 24.

Lighting controller 21 is a schedule controller which controls at least one lighting device 30 under the command of lighting controller 21, based on schedule information A. Lighting controller 21 includes communication circuit 20*a*, control unit 20*c*, and storage 20*d*. Each of communication circuit 20*a* and storage 20*d* is connected to control unit 30*c*.

Communication circuit 20*a* includes an antenna, a wireless module, etc. Communication circuit 20*a* is capable of communicating with the plurality of lighting devices 30 by radio r1. It is to be noted that communication circuit 20*a* may be capable of communicating with the plurality of lighting devices 30 in a wired manner.

Storage 20*d* includes a RAM, a ROM, etc. Storage 20*d* stores identification information of lighting device 21 itself and identification information of each of the at least one lighting device 30 under the command of lighting controller 21. The identification information is, for example, a MAC address. It is to be noted that the identification information is not limited to the MAC address, and may be another address such as a unique device identifier (UDID).

Storage 20*d* stores, for example, schedule information A out of schedule information A to D illustrated in FIG. 4. Schedule information A includes schedule data in which the lighting state of lighting device 30 and a time point or a time period are associated with each other and further includes identification information of lighting controller 21 which controls the at least one lighting device 30 under the command of lighting controller 21 based on the schedule data. For example, schedule information A includes: schedule data in which "LIGHTING STATE OF LIGHTING DEVICE: ON AT 100%" and "TIME POINT: 8:00 TO 12:00" are associated with each other; and identification information "aaa" of lighting controller 21. Schedule information A of storage 20*d* is rewritten when new schedule information A is transmitted from operation terminal 10. It is to be noted that schedule information A before the rewriting may be rewritten when lighting controller 21 is installed in a part of a building, or may be rewritten in storage 20*d* when lighting controller 21 is manufactured.

Control unit 20*c* includes a CPU, etc., and controls the lighting state of the at least one lighting device 30 out of the plurality of lighting devices 30, based on schedule information A. In addition, control unit 20*c* receives schedule information A transmitted from operation terminal 10, and rewrites schedule information A stored in storage 20*d*. Control unit 20*c* receives an information request command transmitted from operation terminal 10. Information requested by operation terminal 10 is, for example, the identification information of lighting controller 21 itself. Upon receiving the information request command, control unit 20*c* returns the identification information thereof to operation terminal 10 via communication circuit 20*a*.

Operation terminal 10 is a setting device which generates or edits schedule information A to D, and transmits the schedule information A to D to respective lighting controllers 21 to 24. Operation terminal 10 includes communication circuit 10*a*, display 10*b*, storage 10*d*, and terminal controller 10*c*. Each of communication circuit 10*a*, display 10*b*, and storage 10*d* is connected to terminal controller 10*c*.

Communication circuit 10*a* includes an antenna, a wireless module, etc. Communication circuit 10*a* is capable of communicating with each of lighting controllers 21 to 24 by radio r1.

Storage 10*d* includes a RAM, a ROM, etc. Storage 10*d* stores, for example, identification information of operation terminal 10 itself and schedule information A to D. Storage 10*d* further stores map information, as illustrated in FIG. 2, indicating, in an associated manner, (i) arrangement information indicating installation positions of lighting devices 30 and lighting controllers 21 to 24 and (ii) identification information of each of lighting devices 30 and lighting controllers 21 to 24. A user who performs schedule setting to lighting system 1 generates or edits schedule information A to D while referring to the map information, or determines lighting controllers 21 to 24 to which schedule information A to D should be transmitted. The identification information of each of lighting controllers 21 to 24 which are transmission targets of schedule information A to D is stored in storage 10*d*.

Display 10*b* is a touch-panel type display. Display 10*b* displays the numerical signs of lighting controllers 21 to 24 which are transmission targets of schedule information A to D (see (a) of FIG. 6), and displays information indicating, for example, that the transmission of schedule information A to D has been ended. In addition, display 10b includes input unit 10e such as a touch key. Input unit 10e is used to generate or edit schedule information A to D and to give a start instruction for schedule setting.

Terminal controller 10c includes a CPU, etc. Terminal controller 10c receives schedule information A to D input through input unit 10e, and stores the information in storage 10d. In addition, terminal controller 10c receives the start instruction input through input unit 10e, and performs the schedule setting of lighting system 1.

For example, terminal controller 10c according to this embodiment requests lighting controller 21 connected to return the identification information of lighting controller 21, before transmitting schedule information A. In this way, terminal controller 10c obtains the identification information returned from lighting controller 21. In addition, terminal controller 10c obtains, from storage 10d, identification information of lighting controller 21 which is the transmission target of schedule information A. Next, terminal controller 10c compares the identification information of the current lighting controller and the identification information of the target lighting controller. When there is a match in identification information, terminal controller 10c transmits schedule information A to lighting controller 21 connected.

In this way, in lighting system 1, schedule information A can be reliably transmitted to lighting controller 21 by confirming that lighting controller 21 connected is identical to lighting controller 21 which is the transmission target of schedule information A before schedule information is transmitted.

1-3. The Method for Transmitting Schedule Information in the Lighting System A method for transmitting schedule information in lighting system 1 is described with reference to FIGS. 5 to 7. The method for transmitting schedule information is used, for example, when rewriting schedule information A stored in lighting controller 21, or when newly writing schedule information A to lighting controller 21 which does not store schedule information.

Figure 5:
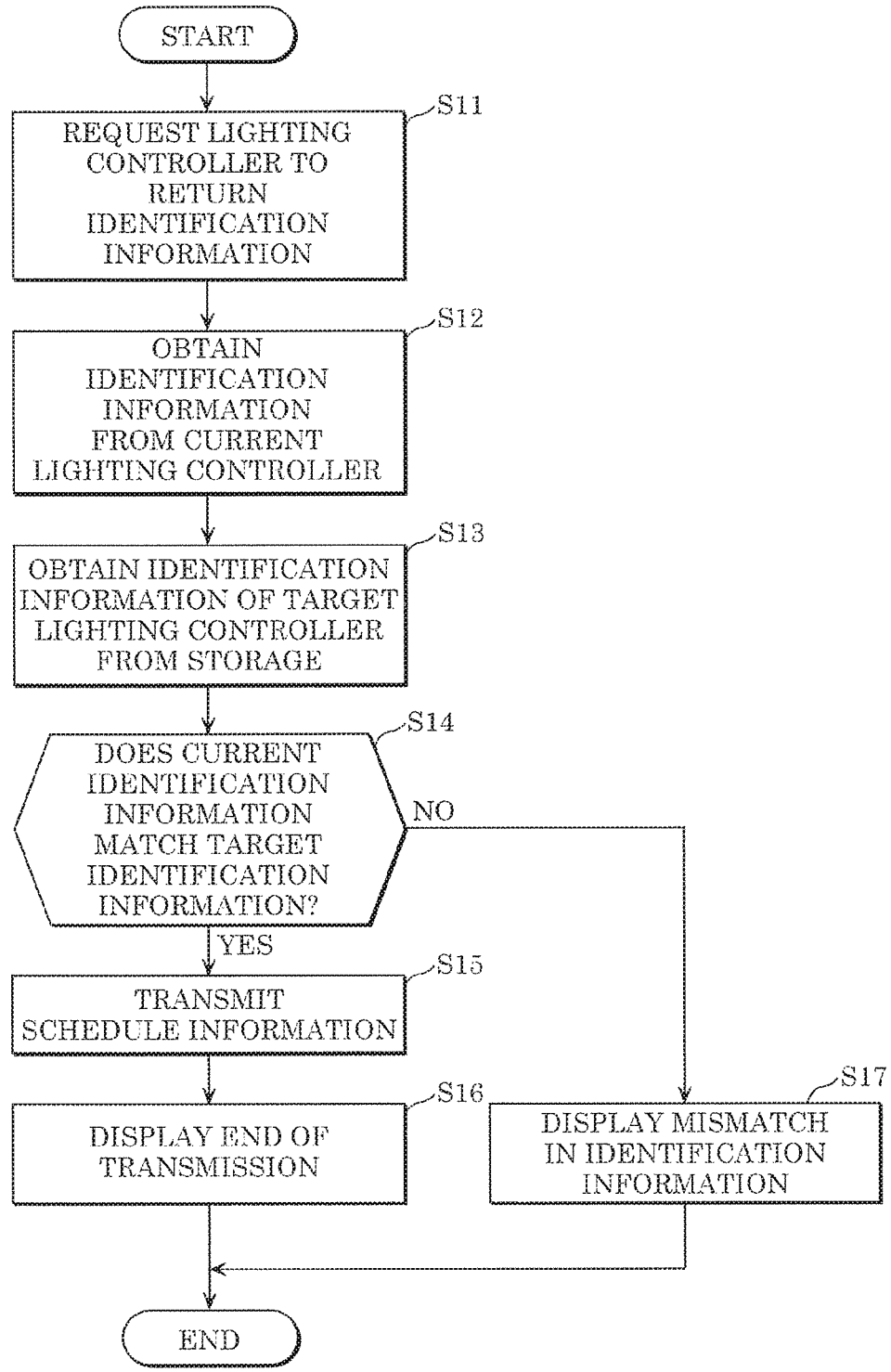
FIG. 5 is a flowchart indicating a method for transmitting schedule information in the lighting system according to the embodiment.
Figure 6:
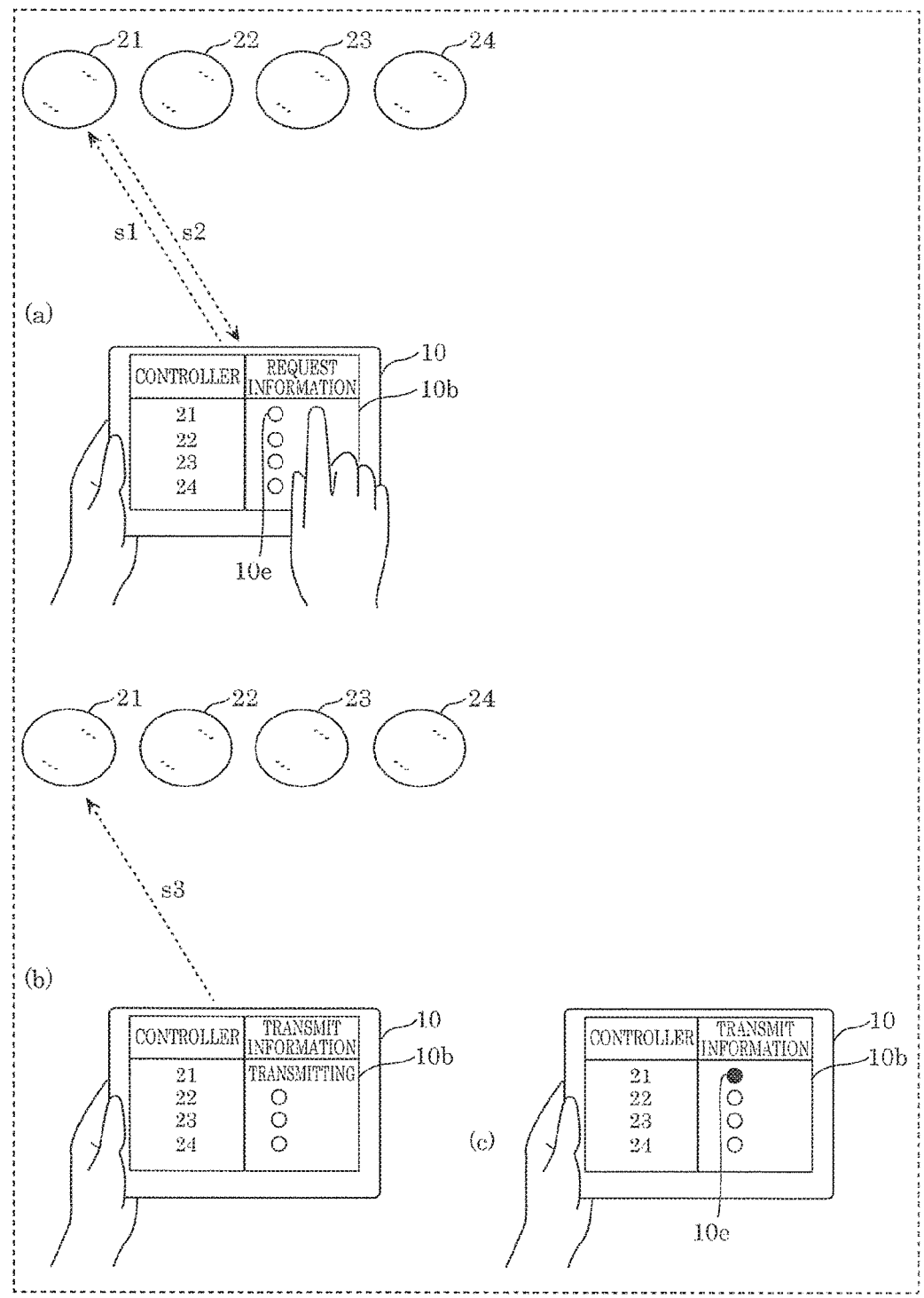
FIG. 6 is a diagram illustrating a scene in which schedule information is transmitted from the operation terminal to one of the lighting controllers in the lighting system according to the embodiment.

FIG. 5 is a flowchart indicating the method for transmitting schedule information in lighting system 1. FIG. 6 is a diagram illustrating a scene in which schedule information A is transmitted from operation terminal 10 to lighting controller 21.

First, terminal controller 10c of operation terminal 10 requests lighting controller 21 to return identification information, before transmitting schedule information A to lighting controller 21 which is the transmission target of schedule information A (S11). This request is input by means of a user touching input unit 10e corresponding to lighting controller 21 as illustrated in (a) of FIG. 6.

Upon receiving the request inputted, terminal controller 10c multicasts information request signal s1 via communication circuit 10a. Information request signal s1 includes the identification information of lighting controller 21 which is actually connected to operation terminal 10. For this reason, information request signal s1 is received only by lighting controller 21.

Upon receiving information request signal s1, control unit 20c of lighting controller 21 reads out the identification information of the unit itself from storage 20d. Next, control unit 20c returns return signal s2 including the identification information of the unit itself to operation terminal 10 via communication circuit 20a. In this way, operation terminal 10 obtains the identification information of lighting controller 21 connected from lighting controller 21 (S12).

In addition, terminal controller 10c of operation terminal 10 reads out, from storage 10d, the identification information of lighting controller 21 which is the transmission target of schedule information A, so as to obtain the identification information (S13). Step S13 may be executed simultaneously with Step S11 or Step S12, or may be executed between Step S11 and Step S12.

Next, terminal controller 10c checks whether or not the identification information of the current lighting controller matches the identification information of the target lighting controller (S14). More specifically, terminal controller 10c determines, by comparison, whether or not the identification information obtained from lighting controller 21 connected matches the identification information of lighting controller 21 obtained from storage 10d.

When the identification information of the current lighting controller matches the identification information of the target lighting controller (Y in S14), terminal controller 10c transmits schedule information A to lighting controller 21 via communication circuit 10a (S15). More specifically, terminal controller 10c transmits schedule transmission signals s3 including schedule information A to lighting controller 21 connected as illustrated in (b) of FIG. 6. In this way, schedule information A in which the lighting state of at least one lighting device 30 under the command of lighting controller 21 which is the transmission target out of the plurality of lighting controllers and a time point or a time period are associated with each other is transmitted to lighting controller 21 which is originally the transmission target. Schedule information A includes the identification information of lighting controller 21 which is the transmission target.

It is to be noted that schedule transmission signal s3 is automatically transmitted. Time from when return signal s2 is received in Step S12 to when schedule transmission signal s3 is transmitted in Step S15 is, for example, no longer than 1 second.

After the transmission of schedule transmission signal s3 is ended, terminal controller 10c causes display 10b to display information indicating that the transmission of schedule information A has been ended (S16). More specifically, the color of input unit 10e which is a part of display 10b is changed as illustrated in (c) of FIG. 6. With the change in input unit 10e, the user can visually recognize that schedule information A has been successfully transmitted to lighting controller 21.

When the identification information transmitted from operation terminal 10 matches the identification information of the controller itself, lighting controller 21 which has received schedule transmission signal s3 receives a writing command of schedule information A and stores schedule information A in storage 20d. Control unit 20c of lighting controller 21 controls the lighting state of the at least one lighting device 30 under the command of lighting controller 21 based on schedule information A received. In this way, schedule information A to D generated or edited by operation terminal 10 is transmitted from operation terminal 10 to each of lighting controllers 21 to 24. Through these processes, the schedule setting in lighting system 1 is ended.

Figure 7:
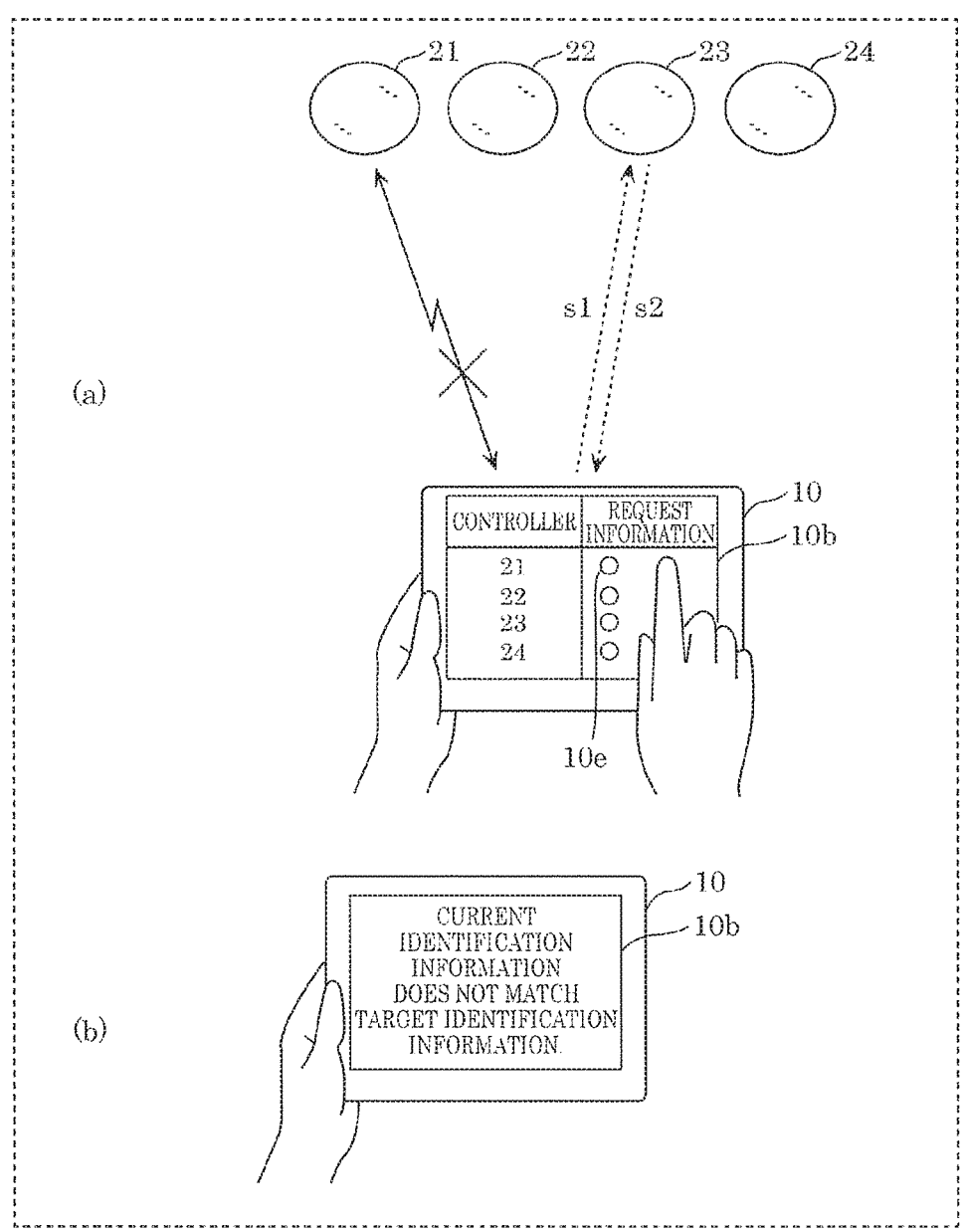
FIG. 7 is a diagram illustrating a scene in which a connection has been established with a lighting controller unintended by the operation terminal in the lighting system according to the embodiment.

Next, a case of a mismatch in identification information of lighting controller 21 is described. FIG. 7 is a diagram illustrating a scene in which operation terminal 10 is connected to unintended lighting controller 23. Here, unintended lighting controller is referred to as lighting controller that is different from the lighting controller which is the transmission target of schedule information.

For example, in the case where operation terminal 10 establishes communication with unintended lighting controller 23 due to change in radio field state, information request signal s1 is transmitted to unintended lighting controller 23 as illustrated in (a) of FIG. 7. Operation terminal 10 receives return signal s2 from lighting controller 23, and obtains the identification information of lighting controller 23.

Terminal controller 10c checks whether or not the identification information obtained from lighting controller 23 connected matches the identification information of lighting controller 21 obtained from storage 10d (S14), and determines that the identification information of lighting controller 23 does not match the identification information of lighting controller 21 (N in S14). In this case, terminal controller 10c does not transmit schedule transmission signal s3 to lighting controller 23. In this way, it is possible to prevent schedule information A from being erroneously transmitted to lighting controller 23.

In addition, terminal controller 10c causes display 10b to display information indicating a mismatch in identification information as illustrated in (b) of FIG. 7 (S17). The information displayed allows the user to visually recognize that schedule information A has not been successfully transmitted to lighting controller 21.

1-4. Effects, Etc.

Lighting system 1 according to the embodiment includes: a plurality of lighting devices 30; a plurality of lighting controllers 21 to 24 each of which controls a lighting state of at least one lighting device 30 included in the plurality of lighting devices 30; and operation terminal 10 configured to control the plurality of lighting controllers. Operation terminal 10 includes: storage 10d configured to store identification information of each of the plurality of lighting controllers 21 to 24; a communication circuit 10a configured to perform wireless communication with the plurality of lighting controllers 21 to 24; and a terminal controller 10c configured to transmit schedule information A to D for each of the plurality of lighting devices 30 to the plurality of lighting controllers via communication circuit 10a. The schedule information indicates a lighting state and a time point or a time period which are associated with each other. Terminal controller 10c is configured to obtain identification information of a current lighting controller (for example, lighting controller 21) currently connected to operation terminal 10 from current lighting controller 21 via communication circuit 10a. Terminal controller 10c is configured to then confirm, based on the identification information, that current lighting controller 21 is identical to target lighting controller 21 to which schedule information A for target lighting devices 30 is to be transmitted, and then transmit schedule information A for target lighting device 30 to current lighting controller 21.

In this way, in lighting system 1, schedule information A can be reliably transmitted to lighting controller 21 by confirming that lighting controller 21 connected is identical to lighting controller 21 which is the transmission target of schedule information A is made before schedule information A is transmitted.

In addition, terminal controller 10c may be configured to: obtain the identification information of current lighting controller 21; obtain, from storage 10d, the identification information of target lighting controller 21; determine whether or not the identification information of current lighting controller 21 matches the identification information of target lighting controller 21; and transmit schedule information A for target lighting device 30 to current lighting controller 21 when the identification information of current lighting controller 21 matches the identification information of target lighting controller 21.

In this way, schedule information A can be reliably transmitted to lighting controller 21 by confirming that the identification information of lighting controller 21 connected matches the identification information of lighting controller 21 which is the transmission target of schedule information A.

In addition, terminal controller 10c may be configured to obtain the identification information of current lighting controller 21 by requesting current lighting controller 21 to return the identification information of current lighting controller 21.

In this way, it is possible to timely get the identification information of lighting controller 21 connected to operation terminal 10, and to reliably transmit schedule information A to lighting controller 21.

In addition, operation terminal 10 may include display 10b, and terminal controller 10c may be configured to cause display 10b to display information indicating a mismatch in identification information when the identification information of a current lighting controller does not match the identification information of a target lighting controller.

With this, the user can visually recognize that schedule information A was not successfully transmitted to lighting controller 21.

In addition, terminal controller 10c may also transmit identification information of one of lighting controllers 21, 22, 23, and 24 which is connected to operation terminal 10 to the one of lighting controllers 21, 22, 23, and 24 when transmitting schedule information A, B, C, or D to the one of lighting controllers 21, 22, 23, and 24. Each of lighting controllers 21 to 24 may control the lighting state of at least one lighting device 30 based on schedule information A, B, C, or D when the transmitted identification information matches the identification information of the controller itself.

In addition, the terminal controller is configured to: store, in the storage, the identification information of the current lighting controller obtained; and replace the identification information of the target lighting controller in the storage with the identification information of the current lighting controller when the identification information of the current lighting controller does not match the identification information of the target lighting controller.

In this way, each of lighting controllers 21 to 24 is capable of controlling the at least one lighting device 30 under the command of the lighting controller, based on right schedule information A, B, C, or D transmitted from operation terminal 10.

Operation terminal 10 according to the embodiment includes: communication circuit 10a configured to establish communication with a lighting controller having a strong radio field intensity among a plurality of lighting controllers 21 to 24 which control lighting states of a plurality of lighting devices 30; storage 10d configured to store identification information of each of the plurality of lighting controllers 21 to 24; and terminal controller 10c configured to transmit schedule information A for target lighting controller 21 device 30 to the target lighting controller 21 via communication circuit 10a. Schedule information A for target lighting device 30 indicates a lighting state of target lighting device 30 and a time point or a time period which are associated with each other. Target lighting device 30 is under command of target lighting controller 21. Storage 10d is configured to store identification information of target lighting controller 21. Terminal controller 10c is configured to obtain identification information of current lighting controller 21 currently connected to operation terminal 10 from current lighting controller 21 via communication circuit 10a, confirm that the identification information of current lighting controller 21 is identical to the identification information of target lighting controller 21, and then transmit schedule information A for target lighting device 30 to current lighting controller 21.

In this way, schedule information A can be reliably transmitted to lighting controller 21 by confirming that lighting controller 21 connected is identical to lighting controller 21 which is the transmission target of schedule information A using operation terminal 10 before schedule information A is transmitted.

It is to be noted that terminal controller 10c may be configured to obtain the identification information of current lighting controller 21, obtain, from storage 10d, the identification information of target lighting controller 21 to which the schedule information for target lighting device 30 is to be transmitted, determine whether or not the identification information of current lighting controller 21 matches the identification information of target lighting controller 21, and transmit the schedule information for target lighting device 30 to current lighting controller 21 when the identification information of current lighting controller 21 matches the identification information of target lighting controller 21.

In addition, terminal controller 10c may be configured to obtain the identification information of current lighting controller 21 by requesting current lighting controller 21 to return the identification information of current lighting controller 21.

In addition, operation terminal 10 may include display 10b, and terminal controller 10c may be configured to cause display 10b to display information indicating a mismatch in identification information when the identification information of a current lighting controller does not match the identification information of a target lighting controller.

A method for transmitting schedule information according to the embodiment is performed in lighting system 1. Lighting system 1 includes: a plurality of lighting devices 30; a plurality of lighting controllers 21 to 24 each of which controls a lighting state of at least one lighting device included in the plurality of lighting devices 30; and operation terminal 10 which controls a current lighting controller currently connected to operation terminal 10. The schedule information indicates a lighting state and a time point or a time period which are associated with each other. The schedule information transmitting method includes: obtaining identification information of the current lighting controller (for example, lighting controller 21) from current lighting controller 21 via communication circuit 10a, and after it is confirmed that current lighting controller 21 is identical to target lighting controller 21 to which the schedule information for target lighting device 30 is to be transmitted, transmitting the schedule information for target lighting device 30 to current lighting controller 21.

In this way, schedule information A can be reliably transmitted to lighting controller 21 by confirming that lighting controller 21 connected is identical to lighting controller 21 which is the transmission target of schedule information A before schedule information A is transmitted.

Variation 1

Figure 8:
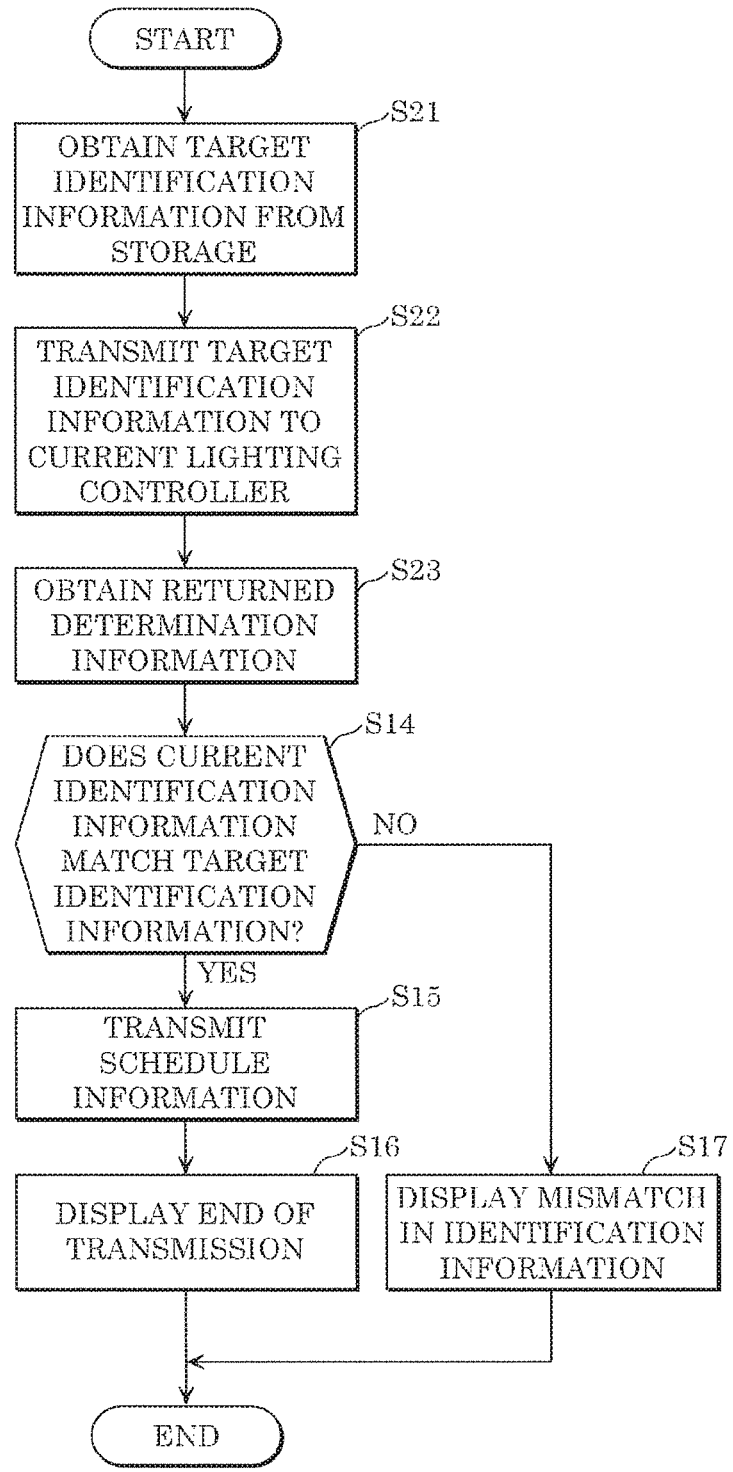
FIG. 8 is a flowchart indicating a method for transmitting schedule information in the lighting system according to Variation 1 of the embodiment.

Lighting system 1 according to Variation 1 of the above-described embodiment differs from lighting system 1 according to the embodiment in that lighting controller 21 determines whether identification information of a current lighting controller matches identification information of a target lighting controller. FIG. 8 is a flowchart indicating a schedule information transmitting method for lighting system 1 according to Variation 1 of the embodiment.

Terminal controller 10c of operation terminal 10 according to Variation 1 reads out identification information of lighting controller 21 from storage 10d before transmitting schedule information A to lighting controller 21 (S21).

Next, terminal controller 10c transmits the read-out identification information of lighting controller 21 to lighting controller 21 connected (S22).

Control unit 20c of lighting controller 21 receives the identification information transmitted from operation terminal 10, and determines whether or not the transmitted identification information matches the identification information of the controller itself. Next, control unit 20c returns determination information relating to the identification information to operation terminal 10.

In this way, terminal controller 10c of operation terminal 10 obtains the determination information relating to the identification information from lighting controller 21 (S23). The determination information is information indicating whether or not the identification information of the current lighting controller matches the identification information of the target lighting controller.

Based on the obtained information, terminal controller 10c checks whether or not the identification information of lighting controller 21 connected is identical to the identification information of lighting controller 21 which is the transmission target of schedule information A (S14). After confirming a match in identification information (Yes in S14), schedule information A is transmitted to lighting controller 21 connected (S15). The subsequent steps are similar to those in the embodiment described with reference to FIG. 5.

Also in Variation 1, terminal controller 10c obtains identification information from lighting controller 21 connected to operation terminal 10 via communication circuit 10a. Next, based on the identification information, after the confirmation that lighting controller 21 connected matches lighting controller 21 which is the transmission target of schedule information A, terminal controller 10c transmits schedule information A to lighting controller 21 connected.

In this way, in lighting system 1 according to Variation 1, schedule information A can be reliably transmitted to lighting controller 21 connected by confirming that lighting controller 21 connected is identical to lighting controller 21 which is the transmission target of schedule information A before schedule information A is transmitted.

Variation 2

Variation 2 of the embodiment is an embodiment in which the identification information of lighting controller 21 which is a transmission target is modified when identification information of current lighting controller 21 does not match identification information of target lighting controller 21.

Figure 9:
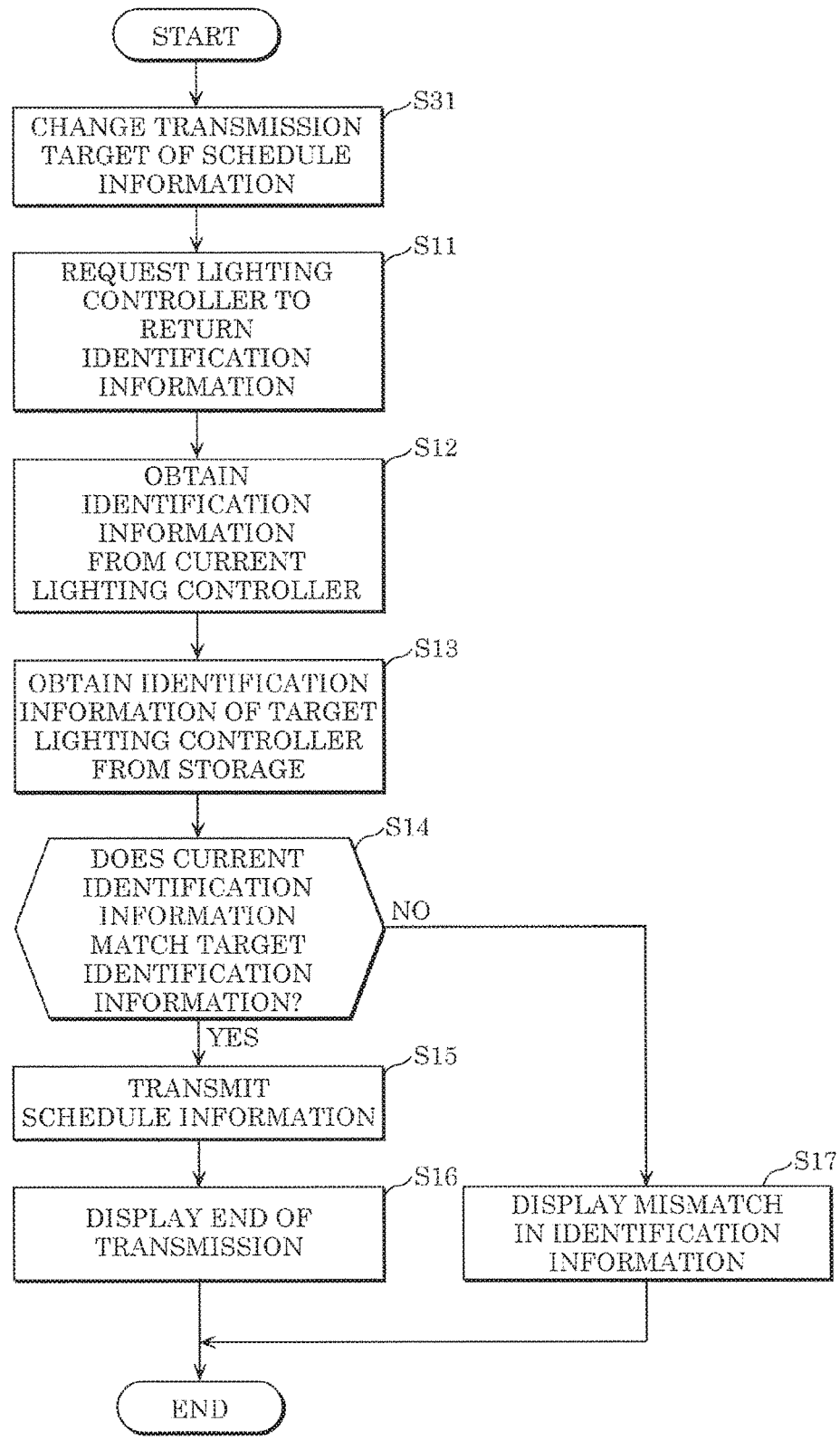
FIG. 9 is a flowchart indicating a method for transmitting schedule information in the lighting system according to Variation 2 of the embodiment.
Figure 10:
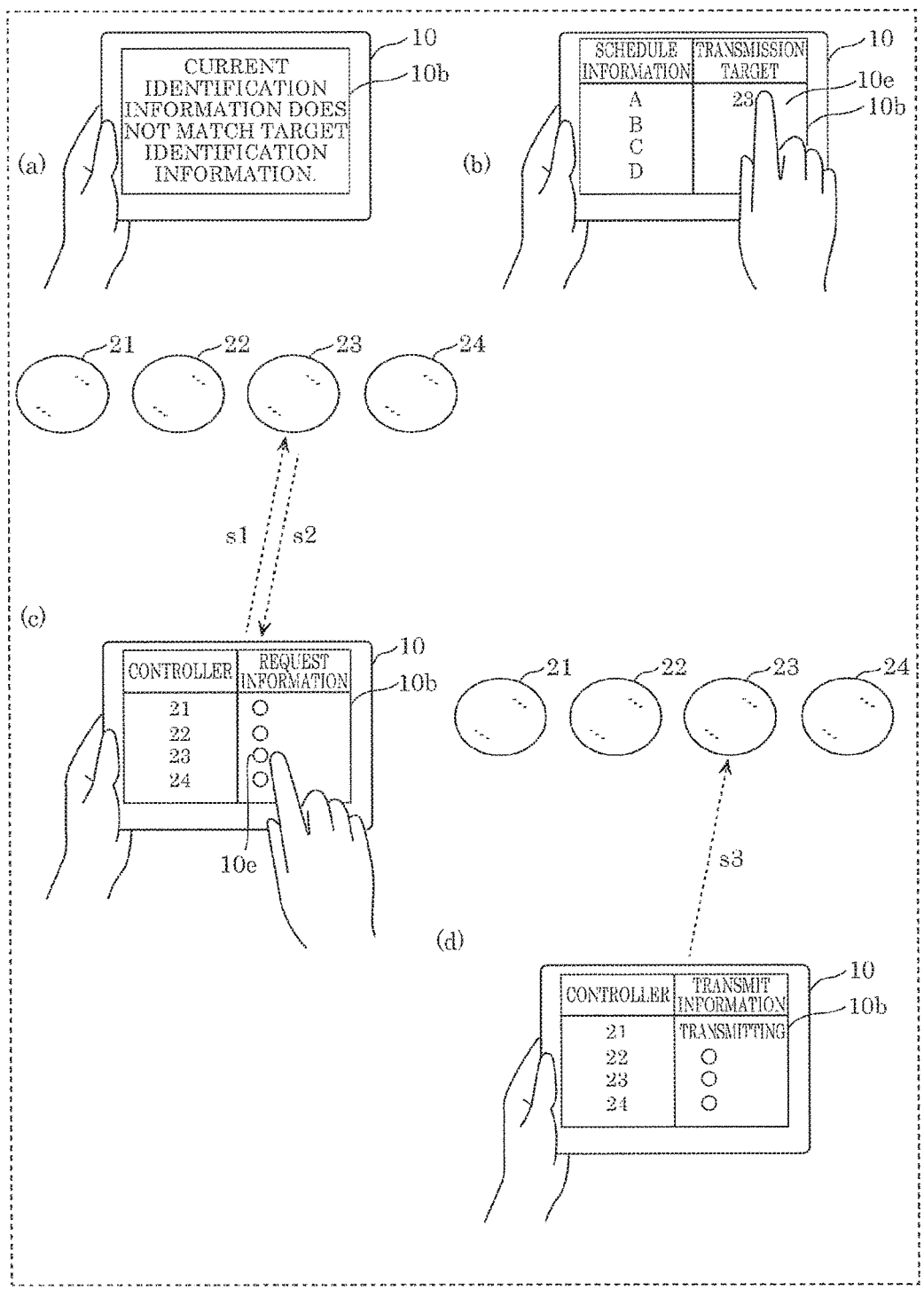
FIG. 10 is a diagram illustrating a scene in which schedule information is transmitted from the operation terminal to one of the lighting controllers in the lighting system according to Variation 2 of the embodiment.

FIG. 9 is a flowchart indicating a method for transmitting schedule information in lighting system 1 according to Variation 2 of the embodiment. FIG. 10 is a diagram indicating a scene in which schedule information A is transmitted from operation terminal 10 to lighting controller 23 in lighting system 1 according to Variation 2.

When the identification information of lighting controller 23 connected to operation terminal 10 does not match the identification information of lighting controller 21 which is the transmission target of schedule information A, as illustrated in (a) of FIG. 10, information indicating a mismatch in identification information is displayed on display 10b.

As illustrated in FIG. 4, schedule data of lighting controller 23 is the same as schedule data of lighting controller 21, the schedule data of lighting controller 21 can be used as the schedule data of lighting controller 23. For this reason, as illustrated in (b) of FIG. 10, the transmission target of the schedule data of lighting controller 21 is replaced by lighting controller 23 (S31). More specifically, identification information "aaa" included in schedule information A is replaced by identification information "ccc" of lighting controller 23.

The subsequent steps are similar to those in the embodiment as illustrated in FIG. 5. For example, as illustrated in (c) of FIG. 10, terminal controller 10c requests lighting controller 23 to return the identification information. Next, after terminal controller 10c confirms that lighting controller 23 connected is identical to lighting controller 23 which is the transmission target, as illustrated in (d) of FIG. 10, the schedule information as a replacement is transmitted to lighting controller 23.

When terminal controller 10c of operation terminal 10 according to Variation 2 determines that the identification information of the current lighting controller does not match the identification information or the target lighting controller, terminal controller 10c replaces the identification information of a lighting controller (for example, lighting controller 21) which is the transmission target of schedule information A with the identification information of a lighting controller (for example, lighting controller 23) connected to operation terminal 10, and then transmits schedule information A to lighting controller 23 connected.

In this way, for example, the schedule data included in schedule information A of lighting controller 21 can be re-used as schedule data of another lighting controller 23. In this way, in lighting system 1, even when lighting controller 23 connected does not match lighting controller 21 which is the transmission target of the schedule information, it is possible to easily transmit the schedule information by changing the transmission target.

Variation 3

Variation 3 of the embodiment is an embodiment in which schedule information A stored in lighting controller 21 is rewritten when schedule information A is rewritten.

Figure 11:
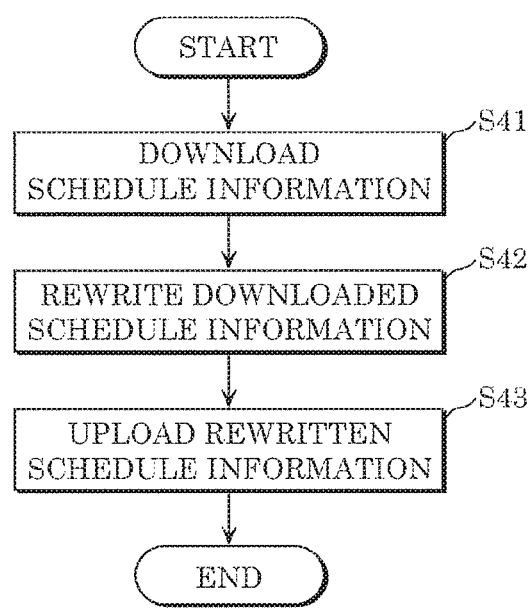
FIG. 11 is a diagram indicating a method for transmitting schedule information in a lighting system according to Variation 3 of the embodiment, that is, a flow for rewriting schedule information of a lighting controller.
Figure 12:
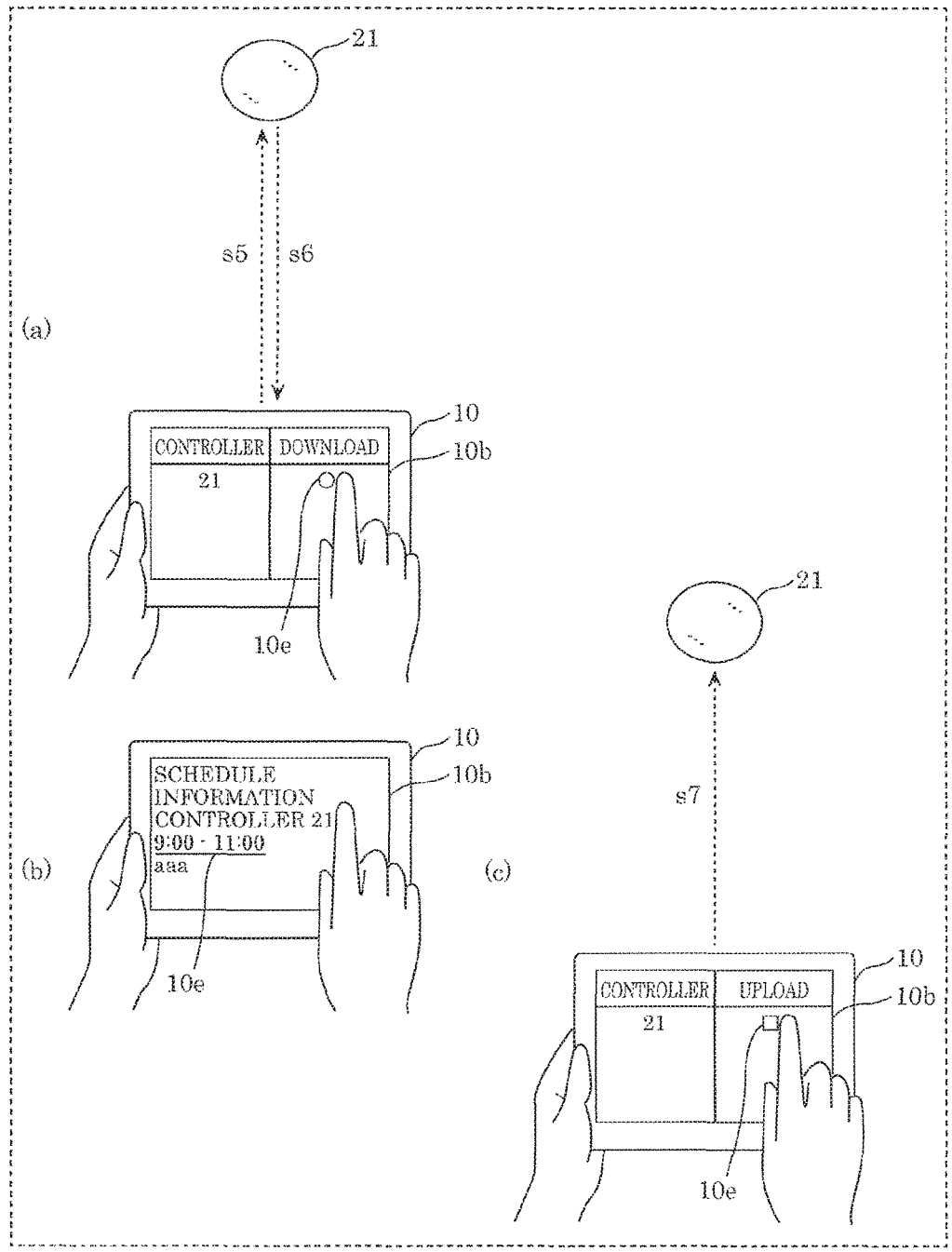
FIG. 12 is a diagram illustrating a scene in which schedule information of the lighting controller is rewritten according to Variation 3 of the embodiment.

FIG. 11 is a diagram indicating a method for transmitting schedule information in lighting system 1 according to Variation 3 of the embodiment, that is, a flow for rewriting schedule information A of lighting controller 21. FIG. 12 is a diagram indicating a scene in which schedule information A of lighting controller 21 is rewritten by a user in lighting system 1 according to Variation 3.

First, schedule information A stored in lighting controller 21 is downloaded by the user via communication circuit 10a of operation terminal 10 (S41). More specifically, as illustrated in (a) of FIG. 12, information request signal s5 for requesting return of schedule information A is transmitted to lighting controller 21 by means of the user touching input unit 10e of operation terminal 10. Upon receiving information request signal s5, control unit 20c of lighting controller 21 reads out schedule information A of the unit itself from storage 20d. Read-out schedule information A includes the identification information of lighting controller 21. Next, control unit 20c returns return signal s6 including schedule information A to operation terminal 10 via communication circuit 20a. In this way, terminal controller 10c of operation terminal 10 obtains schedule information A from lighting controller 21 connected.

Next, downloaded schedule information A is rewritten using input unit 10e of operation terminal 10 (S42). For example, as illustrated in (b) of FIG. 12, a part of information other than the identification information in obtained schedule information A is rewritten. In other words, the identification information of schedule information A is not replaced and only the schedule data is rewritten.

Next, schedule transmission signal s7 including rewritten schedule information A is transmitted to lighting controller 21 via communication circuit 10a of operation terminal 10. In this way, schedule information A of lighting controller 21 is uploaded (S43). It is to be noted that Steps S11 to S14 illustrated in the embodiment may be executed before rewritten schedule information A is transmitted to lighting controller 21. Schedule information A can be reliably transmitted to lighting controller 21 by executing Steps S11 to S14.

Schedule information A includes the identification information of lighting controller 21 in lighting system 1 of Variation 3. Terminal controller 10c obtains schedule information A of current lighting controller 21 connected to operation terminal 10 from current lighting controller 21 via communication circuit 10a, rewrites the part of information other than the identification information in obtained schedule information A, and transmits rewritten schedule information A to lighting controller 21.

In this way, the identification information of obtained schedule information A can be rewritten to schedule information A, which eliminates the need to newly input identification information at operation terminal 10. In addition, it is possible to prevent an input error of identification information by the user, and therefore to reliably transmit schedule information A to lighting controller 21.

Other Variations

Although lighting system 1, a method for transmitting schedule information in lighting system 1, and operation terminal 10 have been described above, the present disclosure is not limited to the embodiment and the variations thereof. For example, the present disclosure encompasses embodiments obtainable by adding various kinds of modifications that a person ordinarily skilled in the art would arrive at and embodiments that can be implemented by arbitrarily combining the constituent elements and functions in the embodiment and variations thereof within the scope of the present disclosure.

For example, the identification information of lighting controller 21 is included in schedule information A in the embodiment, but the present disclosure is not limited thereto. For example, when schedule information A is transmitted in Step 15 of FIG. 5, the identification information of lighting controller 21 may be transmitted at the same time as information different from schedule information A.

In addition, although the information indicating the end of the transmission of schedule information A is displayed after the transmission of schedule transmission signal s3 in Step S16 of FIG. 5 referred to in the embodiment, the present disclosure is not limited thereto. For example, the information indicating the end of the transmission may be displayed after a reception notification of schedule information A from lighting controller 21 is received by operation terminal 10.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system, comprising:
  a plurality of lighting devices;
  a plurality of lighting controllers each of which controls a lighting state of at least one lighting device included in the plurality of lighting devices; and
  an operation terminal configured to control the plurality of lighting controllers, wherein:
  the operation terminal includes:
    a storage configured to store identification information of each of the plurality of lighting controllers;
    a communication circuit configured to perform wireless communication with the plurality of lighting controllers; and
    a terminal controller configured to transmit schedule information for each of the plurality of lighting devices to the plurality of lighting controllers via the communication circuit, the schedule information indicating a lighting state and a time point or a time period which are associated with each other, and
    the terminal controller is configured to:
      obtain identification information of a current lighting controller currently connected to the operation terminal from the current lighting controller via the communication circuit;
      confirm, based on the identification information, that the current lighting controller is identical to a target lighting controller to which the schedule information for a target lighting device is to be transmitted; and
      then transmit the schedule information for the target lighting device to the current lighting controller.

2. The lighting system according to claim 1,
  wherein the terminal controller is configured to:
  obtain the identification information of the current lighting controller;
  obtain, from the storage, the identification information of the target lighting controller;
  determine whether or not the identification information of the current lighting controller matches the identification information of the target lighting controller; and
  transmit the schedule information for the target lighting device to the current lighting controller when the identification information of the current lighting controller matches the identification information of the target lighting controller.

3. The lighting system according to claim 2,
  wherein the terminal controller is configured to obtain the identification information of the current lighting controller by requesting the current lighting controller to return the identification information of the current lighting controller.

4. The lighting system according to claim 2,
  wherein the operation terminal includes a display, and
  the terminal controller is configured to cause the display to display information indicating a mismatch in identification information when the identification information of the current lighting controller does not match the identification information of the target lighting controller.

5. The lighting system according to claim 2,
  wherein, when the identification information of the current lighting controller does not match the identification information of the target lighting controller, the terminal controller is configured to replace the identification information of the target lighting controller with the identification information of the current lighting controller, and then transmit schedule information for a current lighting device to the current lighting controller.

6. The Lighting system according to claim 5,
  wherein the terminal controller is configured to:
  store, in the storage, the identification information of the current lighting controller obtained; and
  replace the identification information of the target lighting controller in the storage with the identification information of the current lighting controller when the identification information of the current lighting controller does not match the identification information of the target lighting controller.

7. The lighting system according to claim 1,
  wherein the schedule information for the target lighting device includes the identification information of the target lighting controller, and
  the terminal controller is configured to obtain schedule information for a current lighting device from the current lighting controller via the communication circuit, rewrite a part of information other than the identification information in the schedule information for the target lighting device obtained, and transmit the schedule information for the target lighting device rewritten to the current lighting controller.

8. The lighting system according to claim 1,
  wherein when transmitting the schedule information for the current lighting device to the current lighting controller, the terminal controller is configured to also transmit the identification information of the target lighting controller, and
  the current lighting controller is configured to control the lighting state of the at least one lighting device based on the schedule information for the at least one lighting device when the identification information of the current lighting controller itself matches the identification information of the target lighting controller transmitted.

9. An operation terminal, comprising:
  a communication circuit configured to establish communication with a lighting controller having a strong radio field intensity among a plurality of lighting controllers which control lighting states of a plurality of lighting devices;
  a storage configured to store identification information of each of the plurality of lighting controllers; and
  a terminal controller configured to transmit schedule information for a target lighting device to the target lighting controller via the communication circuit, the schedule information for the target lighting device indicating a lighting state of the target lighting device and a time point or a time period which are associated with each other, the target lighting device being under command of the target lighting controller, wherein:

the storage is configured to store identification information of the target lighting controller; and the terminal controller is configured to:
obtain identification information of a current lighting controller currently connected to the operation terminal from the current lighting controller via the communication circuit;
confirm that the identification information of the current lighting controller is identical to the identification information of the target lighting controller; and
then transmit the schedule information for the target lighting device to the current lighting controller.

10. The operation terminal according to claim 9,
wherein the terminal controller is configured to obtain the identification information of the current lighting controller, obtain, from the storage, the identification information of the target lighting controller to which the schedule information for the target lighting device is to be transmitted, determine whether or not the identification information of the current lighting controller matches the identification information of the target lighting controller, and transmit the schedule information for the target lighting device to the current lighting controller when the identification information of the current lighting controller matches the identification information of the target lighting controller.

11. The operation terminal according to claim 10,
wherein the terminal controller is configured to obtain the identification information of the current lighting controller by requesting the current lighting controller to return the identification information of the current lighting controller.

12. The operation terminal according to claim 10, further comprising:

a display,
wherein the terminal controller is configured to cause the display to display information indicating a mismatch in identification information when the identification information of the current lighting controller does not match the identification information of the target lighting controller.

13. A method for transmitting schedule information in a lighting system, the lighting system including: a plurality of lighting devices; a plurality of lighting controllers each of which controls a lighting state of at least one lighting device included in the plurality of lighting devices; and an operation terminal which controls a current lighting controller currently connected to the operation terminal, the schedule information indicating a lighting state and a time point or a time period which are associated with each other, the schedule information transmitting method comprising:

obtaining identification information of the current lighting controller from the current lighting controller via the communication circuit; and after it is confirmed that the current lighting controller is identical to a target lighting controller to which schedule information for the target lighting device is to be transmitted, transmitting the schedule information for the target lighting device to the current lighting controller.

* * * * *